United States Patent
Kowalski et al.

(10) Patent No.: US 6,337,619 B1
(45) Date of Patent: Jan. 8, 2002

(54) METHOD OF SELECTING AN ELECTRONIC MODULE FROM A PLURALITY OF MODULES PRESENT IN THE INTERROGATION FIELD OF A TERMINAL

(75) Inventors: Jacek Kowalski, Trets; Bruno Charrat, Aix en Provence; Eric Bouyoux, Bouc Bel Air; Michel Martin, Rognes, all of (FR)

(73) Assignee: Inside Technologies, Saint Clement les Places (FR)

( * ) Notice: Subject to any disclaimer, the term of this patent is extended or adjusted under 35 U.S.C. 154(b) by 0 days.

(21) Appl. No.: 09/187,517

(22) Filed: Nov. 6, 1998

Related U.S. Application Data (63) Continuation of application No. PCT/FR97/00802, filed on May 6, 1997.

(30) Foreign Application Priority Data

May 6, 1996 (FR) .............................................. 96 05937

(51) Int. Cl.$^7$ ................................................. H04Q 5/22
(52) U.S. Cl. ..................... 340/10.1; 340/10.2; 340/10.4; 340/10.42; 340/572.1; 340/572.2; 340/572.4
(58) Field of Search ....................... 340/825.54, 825.49, 340/825.34, 572.1, 572.2, 572.4, 825.5, 10.1, 10.42, 10.2; 370/448

(56) References Cited

U.S. PATENT DOCUMENTS

| | | | | |
|---|---|---|---|---|
| 5,537,105 A | * | 7/1996 | Marsh et al. ............. | 340/825.5 |
| 5,602,538 A | * | 2/1997 | Orthmann et al. ...... | 340/825.49 |
| 5,751,223 A | * | 5/1998 | Turner .................... | 340/825.54 |
| 5,751,570 A | * | 5/1998 | Stobbe et al. .................. | 342/44 |
| 5,821,877 A | * | 10/1998 | Fallah .................... | 340/825.08 |
| 5,825,299 A | * | 10/1998 | Fuentes et al. ........ | 340/825.54 |

* cited by examiner

Primary Examiner—Brian Zimmerman
Assistant Examiner—Yves Dalencourt
(74) Attorney, Agent, or Firm—Akin, Gump, Strauss, Hauer & Feld, L.L.C.

(57) ABSTRACT

A method for selecting an electronic module from a plurality of at least two modules (M1, M2, M3) capable of emitting messages simultaneously, includes the steps of sending a general query message (ACTIVALL) to the modules, and selecting (AFI, SELECT-ID) the module having responded first, the modules, on receiving a query message (ACTIVALL, ACTIV), determining a random time interval (P) and sending a responding message (ID, R) when the said time interval (P) has elapsed. A module is set in idle position (IDL) when it receives a message (MESS) before the time interval (P) preceding the sending of a response (ID, R) has elapsed. The idle position (IDL) is at least characterized by the fact that one module does not respond, subsequently, to a complementary query message (ACTIV). This invention is particularly useful for contactless smart card readers and for terminals for electronic labels.

15 Claims, 4 Drawing Sheets

METHOD OF SELECTING AN ELECTRONIC MODULE FROM A PLURALITY OF MODULES PRESENT IN THE INTERROGATION FIELD OF A TERMINAL

This application is a con of PCT/FR97/00802 filed May 6, 1997.

The present invention refers to a method of selecting an electronic module from a plurality of modules present in the interrogation field of a terminal, in order to establish a communication between the terminal and the selected module.

In some applications, it happens that several electronic modules try to establish a communication with a terminal at the same moment. This is in particular the case with electronic labels and contactless chip cards when several of these elements are at the same time in the interrogation field of a terminal.

Figure 1:
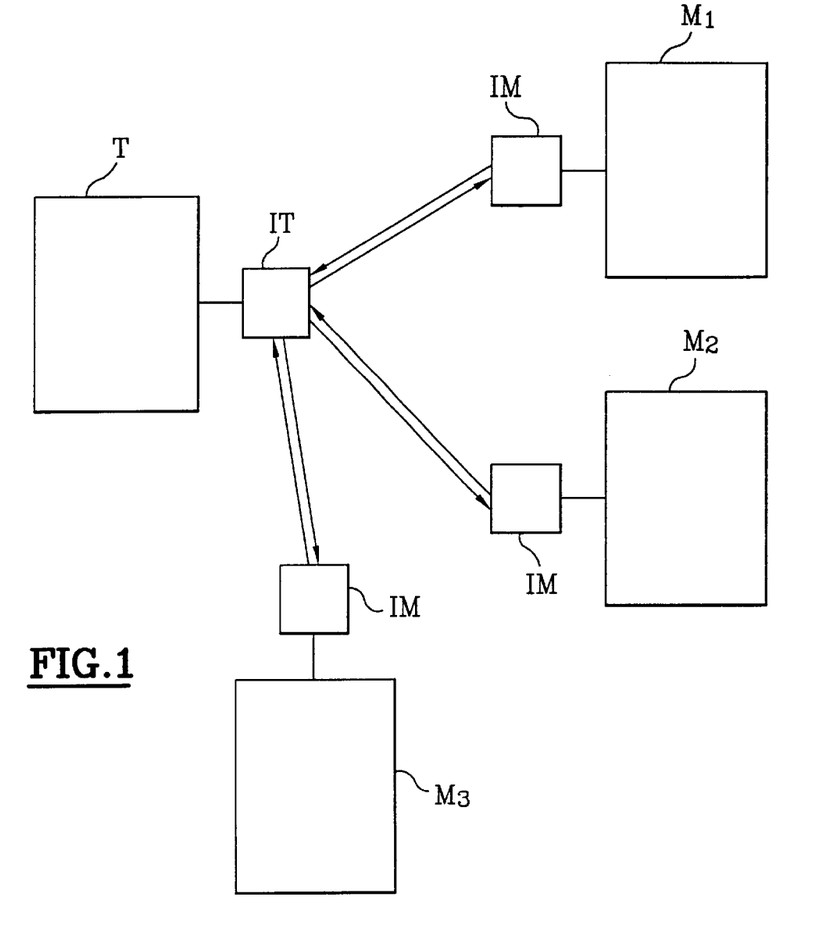
FIG. 1, already described, shows a terminal and several modules.

Such a situation is illustrated in FIG. 1, where a terminal T can be seen in the presence of several electronic modules $M_1$, $M_2$, $M_3$. The terminal T is provided with a communication interface IT enabling the terminal to send messages to the modules and to receive messages emitted by these modules. The modules M are provided with communication interfaces IM enabling them to send messages to the terminal and to receive messages from the terminal.

The terminal has to establish a communication with one of the modules, without preference, to perform operations required by the application, for example a monetary transaction, an identification operation to provide a passage authorisation, a toll operation or simply an identification of the modules which are present. Moreover, this communication, once established, must not be disturbed by messages coming from other modules. In an opposite case, message collisions would occur, which would lead to the reception of electrically disturbed signals and erroneous messages by the terminal.

As a general rule, the terminal does not know the identity of the modules which are present in its interrogation field. This means that it is not possible, generally, that the terminal sends a particular message to a module to render it active, while the others would remain silent. It is also not possible to let the initiative of the communication to the modules, because the latter would emit communication requests in an uncoordinated way which would collide one another or disturb a communication already established with another module. Thus, the generally adopted solution is that the terminal sends a general interrogation message to the modules, then the terminal sorts out the various received answers till one and only one module is selected.

Figure 2A:
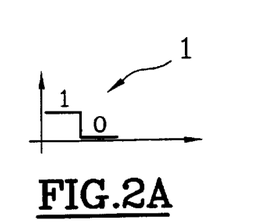
FIGS. 2A to 2C, already described, show a coding enabling the bit by bit detection of message collisions.
Figure 2B:
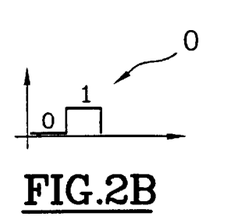
Figure 2C:
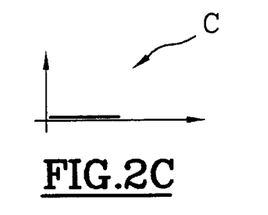

In the prior art, a selection method based on a message surcoding enabling the bit by bit detection of collisions is known. For example, as shown in FIGS. 2A and 2B, the logic "1" of the basic coding is coded "10" and the logic "0" is coded "01". Thus, when a "1" bit (coded "10") of a message emitted by a module enters in collision with a "0" bit (coded "01") of a message emitted by another module, the terminal receives a code "00" or collision code C, the "0" of the basic coding prevailing over the "1" (the "0" corresponding for instance to the ground of the circuit).

To understand the selecting method of the prior art, let's consider now, as a matter of example, the simple case where, in reply to a general interrogation message, the three modules of FIG. 1 send simultaneously the following identification codes to the terminal:

Module 1/code 1: 0 1 0 0
Module 2/code 2 1 1 0 0
Module 3/code 3 1 0 1 1

As each bit of a code is in collision with at least one bit in the same place of another code, the result at the reception is the following:

C C C C

The terminal then requests that the modules having sent an identification code whose first bit is 1 to send again this code (the terminal could also, in a random way, request that only the codes whose first bit is 0 are sent back). The following codes will be sent by the concerned modules:
Code 2: 1 1 0 0
Code 3: 1 0 1 1
The result at the reception of this selective interrogation is the following:

1 C C C

As these is no more collision on the first bit, the terminal will treat the collision on the second bit, by requesting for example that only the messages having 0 as second bit are sent back. After this second selective interrogation, the terminal receives the code 3 without collision and sends it back to all the modules. Module M3 which has emitted it recognises itself and is thus selected.

This conventional selection method can be applied to a large number of modules but has various drawbacks:
the selecting process is rather slow and requires a lot of queries, each new interrogation statistically allowing the selection of only half the modules which were selected at the previous interrogation,
the probability of a collision at the first interrogation depends not only on the number of modules which are actually present in the interrogation field, but also on the number of bits that the module identification codes comprise,
this method is not easy to carry out, because it requires a bit by bit collision detection and therefore the use of a particular coding of the 1s and 0s as described above,
this selection method by bit by bit detection of collisions requires a perfect synchronisation of the various modules, so that the identification code bits emitted by the various modules are perfectly superposed.

Thus, one object of the present invention is to provide a fast selection method.

Another object of the present invention is to provide a selection method which is easy to carry out.

Yet another object of the present invention is to provide a selection method which can be applied to imperfectly synchronised modules.

These objects are obtained by a method of selecting an electronic module from a plurality of at least two modules capable of emitting messages simultaneously, comprising steps consisting in sending a general interrogation message to the modules, the modules being designed, on receiving a interrogation message, to determine a random time interval, then send a response message when the time interval has elapsed; selecting the module having responded first; setting in an idle state the modules having not responded first.

When several modules have responded simultaneously to a interrogation message, there are provided the steps consisting in sending a complementary interrogation message to the modules having responded first, selecting the module having responded first to the complementary interrogation message, and setting in an idle state the modules having not responded first.

According to one embodiment, a module sets itself automatically in an idle state when it receives a message before the time interval preceding the sending of a response has elapsed.

According to one embodiment, a module is also set by its own in an idle state when it receives a non identifiable or unplanned message after having replied to a interrogation message.

Preferably, the idle state is characterised at least by the fact that a module does not respond to a complementary interrogation message.

According to one embodiment, the modules are designed to send, in reply to a interrogation message, an identification message comprising identification data.

According to one embodiment, the modules are designed to send, in reply to a interrogation message, a response message comprising a low number of bits, an identification request is sent to the modules immediately after the reception of at least one response message, and the modules are designed to send, in reply to the identification request, an identification message comprising identification data.

Preferably, a step of sending, to the selected module, a selection confirmation message comprising module identification data is provided.

Preferably, the modules are designed to emit the response message on a temporal response scale comprising a plurality of response positions.

The present invention is particularly suitable for a method of establishing a communication between a terminal and an electronic module, wherein the terminal selects the module with the method according to the invention before communicating with the module.

The present invention refers also to an electronic module designed to determine a random time interval on receiving a interrogation message, then send a response message when the time interval has elapsed and set itself in an idle state when a message is received before the time interval has elapsed.

The present invention refers also to an electronic terminal designed to send a general interrogation message and wait for a response message, detect an eventual collision in a received message, and, if a collision is detected, send a complementary interrogation message and wait for a new response message; if no collision is detected, it sends a selection confirmation message comprising identification data which are comprised in a received identification message.

These characteristics, advantages, as well as others, of the present invention will be explained with more details in the following description of the method according to the invention and an example for carrying out the method, made in a non limiting way in conjunction with the annexed drawings, among which.

GENERAL PRINCIPLE OF THE INVENTION

Figure 3:
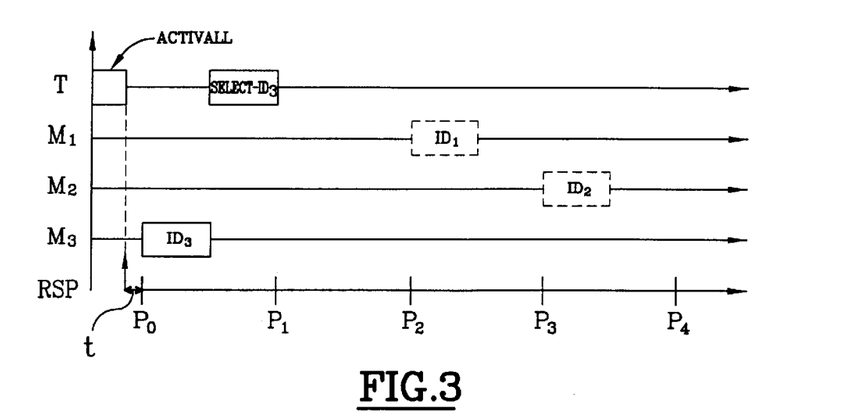
FIGS. 3 and 4 are timing diagrams representing signals exchanged between a terminal and modules according to the method of the invention.

FIG. 3 shows the various messages exchanged between the terminal T and the three modules M1, M2, M3 of FIG. 1, as the present invention provides it. The purpose of these messages is to allow the random selection of a module by the terminal among all the present modules. For the sake of simplicity, the present description will be limited to examples involving three modules only, as already done in the preamble.

First of all, the terminal sends an activation signal ACTIVALL, or general module interrogation signal. According to the invention, the reception of the message ACTIVALL initiates in each module a computation or production step of a random value P, preferably an equiprobable value, which will be called response position in the following. The response position P represents the time when each module sends, on a temporal response scale RSP common to all the modules, a response to the general interrogation message. On the scale RSP shown in FIG. 3, the various response positions P0, P1, P2, P3 . . . capable to be randomly calculated by the modules M1 to M3 are indicated. The scale RSP starts from the end of the message ACTIVALL, but the first position P0 shows, for practical reasons (generation time of the respective response positions by the modules), a temporal offset t with respect to the end of the message ACTIVALL.

According to the invention, the module having emitted first a response to the message ACTIVALL is deemed to be selected. In the represented example, the module M3 is first to respond and the response consists here in sending an identification message ID3 comprising identification data which are specific to the module, as for example its serial number NS. On receiving the message ID3, the terminal sends a selection confirmation message SELECT-ID3. The message SELECT-ID3 comprises the identification data NS comprised in the received message ID3, so that the module M3 is able to know that it is selected. The selection being made, any conventional kind of communication can then take place between the module M3 and the terminal.

Furthermore, it can be seen on FIG. 3 that the modules M1 and M2 have randomly generated response positions, respectively P2 and P3, which are later in time. It is desirable that the modules M1 and M2 do not emit their response ID1 and ID2 when the positions P2, respectively P3, are reached, in order not to disturb the communication between the terminal and the module M3. Thus, and subject to alternative embodiments which will be recalled later, a module sets itself in an idle state or deselection state when it receives some message during the waiting period which precedes the sending of its response ID. In the represented example, the modules M1 and M2 receive the message SELECT-ID3 during the waiting period and are deselected by their own. Instead of the message SELECT-ID3, other ways to deselect the modules can be provided, for example the sending by the terminal of an explicit message deselecting all the modules except module M3, like DESELECT-EXCEPT-ID3.

Figure 4:
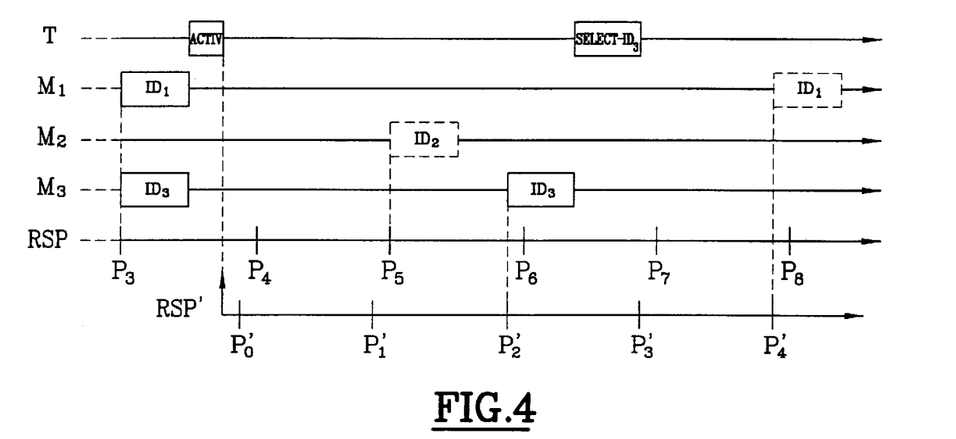

Of course, it is statistically possible that two modules have generated the same response position and that this shared response position is the first of all the response positions generated by the other modules. Such a case is illustrated in FIG. 4, where the modules M1 and M3, after having received the message ACTIVALL (not shown) emit simultaneously their response/identification message ID1 and ID3 at the position P3, the response position generated by module M2 being P5. The terminal receives a message which is disturbed by a collision and emits a complementary interrogation message ACTIV. Contrary to the message ACTIVALL, the message ACTIV concerns only the modules having already sent their response to the general interrogation and causes the deselection (idle state) of the modules which are still waiting for sending the response R. Thus, in FIG. 4, the message ACTIV causes the deselection of module M2, which has not yet replied. At contrary, the modules M1 and M3 generate new random response positions (respectively P2' and P4' in the shown example) on a new response scale RSP' which starts at the time when the complementary interrogation message ACTIV is received. At the end of this new selection cycle, the probability that only one module is selected is still higher. In the example of FIG. 4, the module M3 replies first at the position P2" and receives the selection confirmation SELECT-ID3.

Finally, the idle state (or deselection state) has to be at least such that a module does not reply to a complementary interrogation message ACTIV. The idle state allows the elimination of the modules which have not responded first to the previous general interrogation message ACTIVALL or complementary interrogation message ACTIV.

With the method of the invention, the probability Pnc to have no collision at the first interrogation (or probability to select one module only at the first interrogation) is given by the following statement:

$$P_{nc} = \frac{m \sum_{i=1}^{N_p-1} i^{m-1}}{N p^m} \quad (1)$$

m being the number of modules and Np the number of positions that the response scale RSP comprises.

If a fast selection rapidity is sought, it is preferable if the response scale is not too large, because the response positions can be quite far on the response scale because of their random nature and a significant time can be lost while waiting for the first reply. Thus, it can be advantageous to provide a response scale comprising a low number Np of response positions. The choice of the response position number has however to result from a compromise, because of statement (1) which shows that the probability Pnc to have no collision at the first interrogation is higher, for a given number m of modules, when Np is large. For example, a response scale with 16 positions (Np=16) allows the selection at the first interrogation of one module among six modules (m=6) with a very high probability of about 0.822.

Another advantage of the selection method of the invention is to be particularly fast when the number of modules present in the interrogation field of the terminal is high. Statistically, the module responses are spread in an equiprobable way over each of the response positions. It follows that the number of modules responding on the first response position is statistically equal to m/Np. Thus, one interrogation only allows to divide by Np the number of modules which remain able to be selected.

Figure 5:
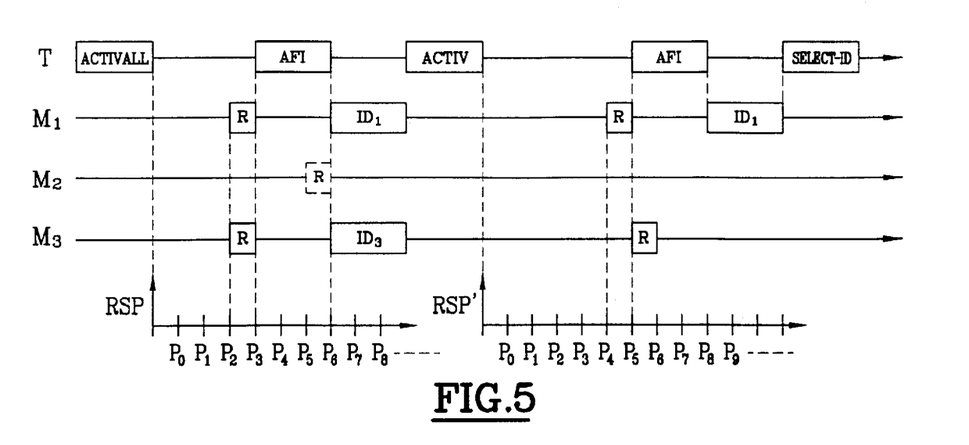
FIG. 5 is a timing diagram representing signals exchanged between a terminal and modules according to an alternative of the method of the invention.

Furthermore, the extend of the response scale and the speed of the selection process depend also on the time interval between two successive response positions $P_i$, $P_{i+1}$. In the example which has just been described, if it is wished to avoid partial collisions between messages ID, the time interval between two successive positions is not negligible and has at least to allow a module to emit a complete response/identification message ID. Thus, another idea of the present invention is to separate the "response" function from the "identification" function in order to compress the response scale. This alternative to the method of the invention will be described now:

Alternative to the general principle: temporal compression of the response scale FIG. 5 shows such an alternative. In response to a general interrogation message ACTIVALL, the modules M1 to M3 emit, at the response position that they have generated, a response message R comprising no identification data. The message R can be very short and comprising a very low number of bits only, for example from one to three bits according to the used transmission technique. The response scale is thus compressed to a maximum as can be seen on FIG. 5, the time interval separating two successive positions $P_i$, $P_{i+1}$ being equal to the emission time of the response R. The response bit or bits R can be the same for all the modules. The terminal does not seek to detect the collisions of the responses R (they will be however no collision if the response code R is the same for all the modules) and emits an identification request message AFI as soon as the first reply is received. On receiving the message AFI, the modules having already replied emit immediately their identification message ID. If two modules have replied simultaneously to the message ACTIVALL, the collision is detected by the terminal at the moment the identification messages ID are received. FIG. 5 illustrates this last case. The modules M1 and M3 which have the same response position P2 respond simultaneously to the message AFI by sending the identification messages ID1 and ID3. The terminal receives a message which is disturbed by the collision of ID1 and ID3 and sends a complementary interrogation message ACTIV. The modules M1 and M3 generate new response positions on a new response scale RSP' which starts at the moment the message ACTIV finishes.

As previously, a module sets itself in the idle state when it receives a message or message beginning before it has emitted its response (case of the module M2, FIG. 5, first interrogation, which receives the first bits of the message AFI before emitting its response). Moreover, it can happen here that a module sends a response R at the moment when the message AFI is emitted by the terminal. For example in FIG. 5, second interrogation, the module M3 replies at the position P5 at the moment when the terminal emits the message AFI, the module M1 having replied at the position P4. The module M3 has however to be deselected (idle state). Various methods are available for the man skilled in the art to deselect a module in such a situation, in particular:

Method i): the length of the time interval separating two successive response positions is selected with at least one bit larger than the duration of the response message R (being understood that the message AFI is still sent immediately after the reception of the first response R). This method allows the creation of a listening space between two replies R. This listening space enables to set in an idle state a module which prepares itself to emit its response at a response position corresponding more or less to the sending of the message AFI. For example, if this method is applied to the case of the module M3, second interrogation, in FIG. 5, the module M3 will not send its response R at position P6 because it will detect the first bit of the message AFI.

This method can be used for example when it is wished to avoid, for technical reasons, that interrogation messages AFI and response messages R are emitted simultaneously (for example in the case of a mere one-wire link between the terminal and the modules, allowing no full-duplex).

Method ii): a module is set in the idle state when it receives a non understandable message after having sent its response.

This method can be used when a module is not able, for technical reasons, to receive the first bits of the message AFI while it is emitting its response R, the message AFI being then received in an incomplete and non understandable manner. For example in FIG. 5, second interrogation, the module M3 discerns only the last bits of the message AFI and does not understand the received message. It sets then itself in an idle state.

Method iii): a module is set in an idle state when it receives an unplanned message after having emitted its response or while it is emitting its response.

This method corresponds to the most general case where a module is capable of receiving and identifying a message, in particular the message AFI, while it is emitting its response. For example in FIG. 5, second interrogation, the module M3 receives the first bits of the message AFI while it is emitting its response R, but it notices that the message AFI should not be received at that moment. It sets itself in an idle state.

Of course, these various methods allowing to set a module in an idle state, as well as others, can be combined.

Example for carrying out the method of the invention

Figure 6:
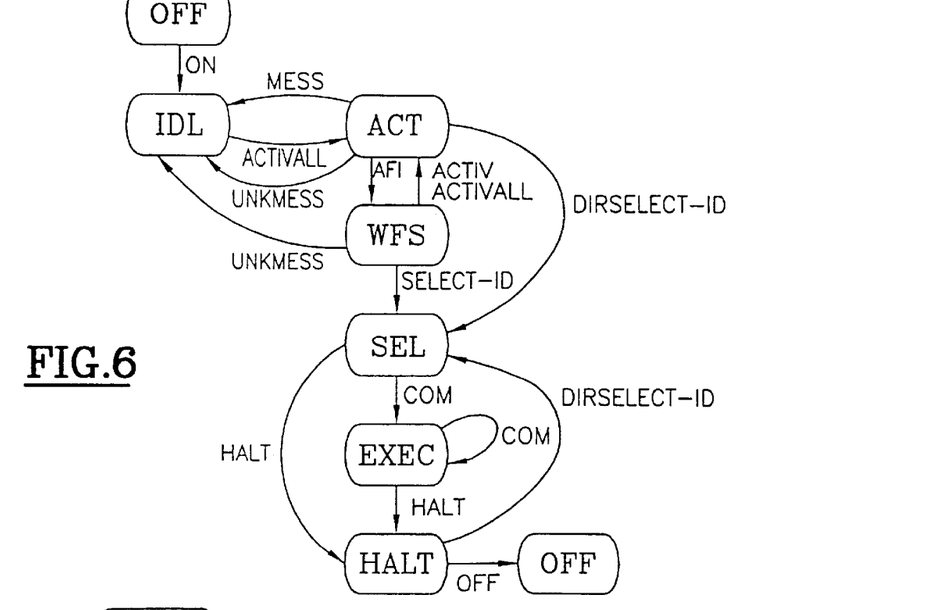
FIG. 6 is a logic state diagram showing the working of a module according to the invention.

FIG. 6 is a logic state diagram showing by way of example and in a simplified manner the working of a module according to the invention, in accordance with the alternative to the method of the invention illustrated in FIG. 5.

Seven logic states are distinguishable:

OFF state (disabled): the module is disabled and cannot respond to any message. In practice, this state may correspond to a non supplied state (power off). For example, when the module is a microcircuit of a contactless chip card supplied by an alternating magnetic field emitted by the terminal, the module is in the OFF state when it is outside the supply field emitted by the terminal (generally about ten centimeters).

IDL state (idle state): the module is supplied but is in an idle state (or deselection state) and can only come out that state by the reception of a general activation/interrogation message ACTIVALL. The idle mode is for example the one of a contactless chip card microcircuit in presence of an inductive supply field emitted by a terminal, the microcircuit being supplied but not yet active.

Figure 7:
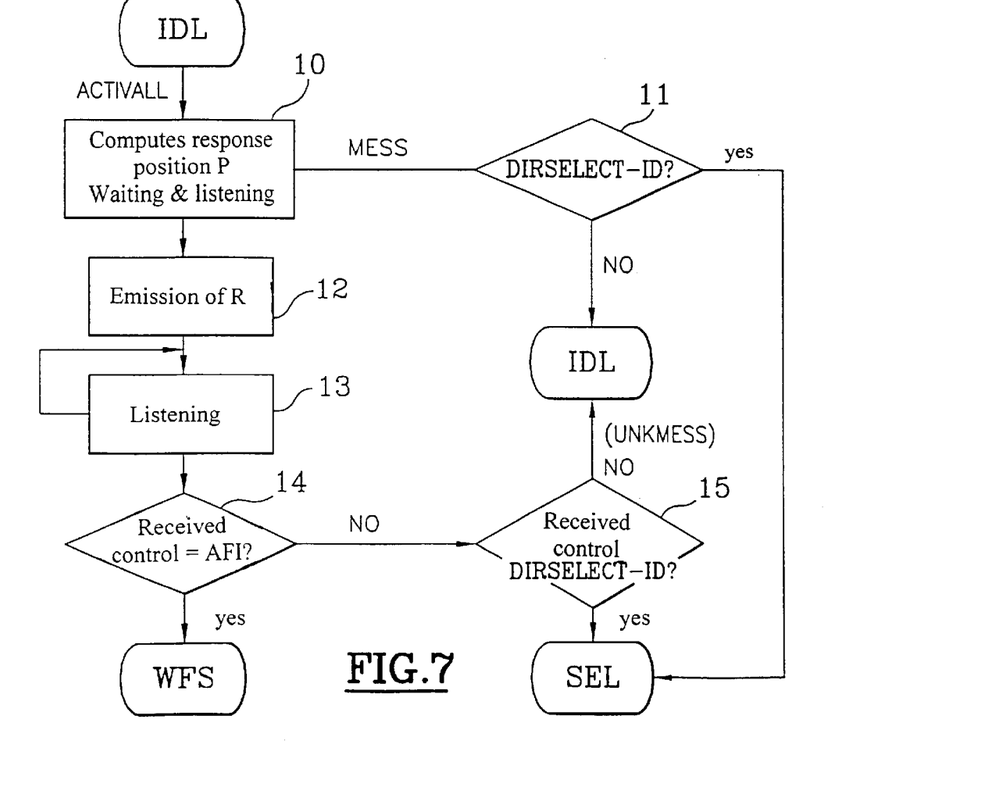
FIGS. 7 and 8 are flow charts showing states of the diagram of FIG. 6 in a more detailed manner.

ACT state (active): the module switches to this state when it receives a message ACTIVALL. The module performs then the following steps, represented in FIG. 7:

step 10: the module computes or generates a response position P and waits for the moment when the response R has to be emitted. During this waiting time, the module remains listening the messages which can be sent by the terminal. If the module receives some message MESS when the response R has not yet been sent, the module deselects itself and returns to the IDL state. As shown in FIG. 7, it can be however provided that the module, before deselecting itself, checks during a check step 11 that the received message MESS is not a direct selection message DIRSELECT-ID comprising its own identification data NS. In such a case, the module directly switches to a SEL state (selected) which will be described later.

step 12: the response position P is reached and the module sends the response R.

step 13: the module waits for a message from the terminal.

check steps 14 and 15: the module has received a message and tries to recognise that message. If the received message is an identification request AFI, the module switches to an WFS state, described hereunder. If the received message is a direct selection DIRSELECT-ID which designates it, the module switches to the SEL state. If not, the message is a message UNKMESS which is unknown or unplanned at this working step, and the module deselects itself by coming back to the IDL state.

Figure 8:
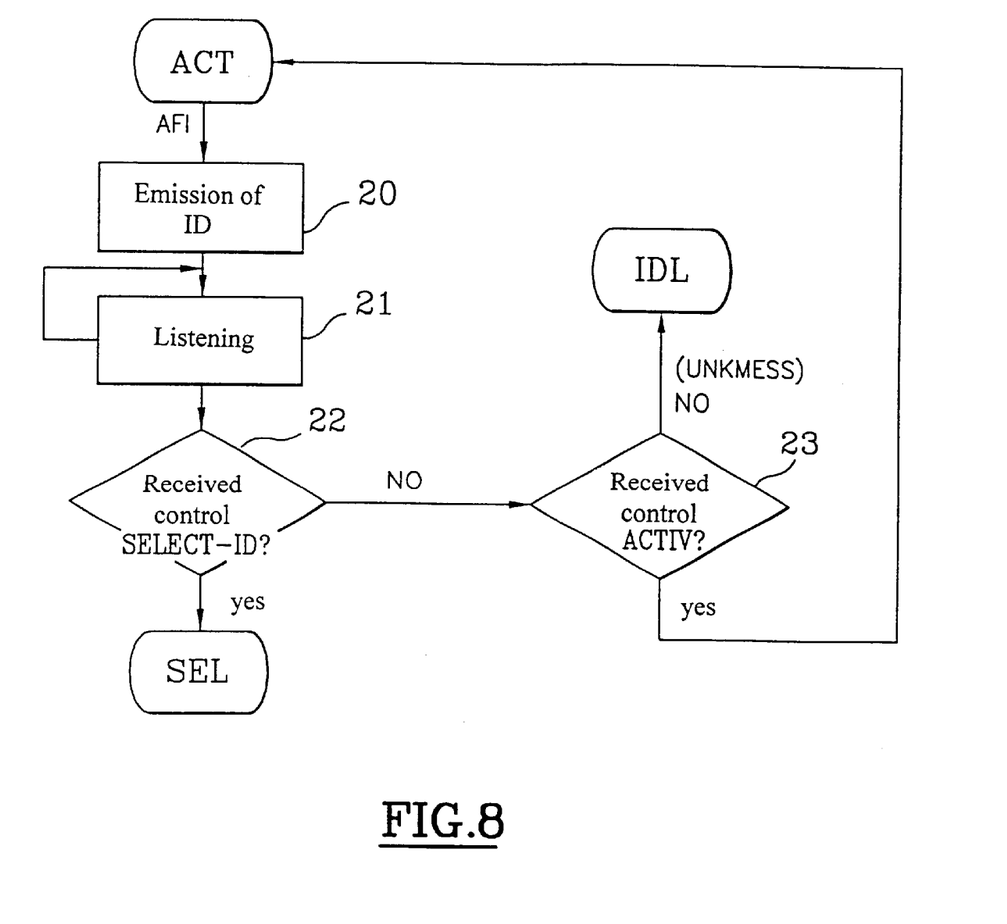

WFS state (waiting for selection): the module switches to this state when it receives the message AFI while it is in the step 13 of the ACT state. The module performs the following steps, represented in FIG. 8 step 20: the module sends an identification message ID. As already indicated, the message ID comprises specific module data, like its serial number.

step 21: the module waits for a message.

check steps 22 and 23: the module has received a message and tries to recognise it. If the received message is a selection message SELECT-ID which designates it, the module switches to the SEL state describes hereunder. If the message is a complementary interrogation ACTIV (the terminal has noticed a collision) the module comes back to the ACT state to generate a new response position P. Lastly, if the message is not identifiable or is not planned at this working step (message UNKMESS), the module deselects itself by coming back to the IDL state.

SEL state (selected): when the module is in the selected state, it can be considered that the communication is established with the terminal, the other modules remaining silent. The terminal sends to the module a first operating command COM which sets the module into an execution state EXEC.

EXEC state (execution): this state is in itself conventional. The module performs functional commands COM for which it has been designed, and which can be of any kind (transaction, authentication, toll, etc.)

HALT state (blocked): at any moment after the moment when the SEL or EXEC states have been reached, the terminal can block the module by sending to it the HALT message, for example when the communication has ended. The blocked state HALT is an inhibiting state, where the module replies no more to general queries ACTIVALL or to complementary queries ACTIV. Thus, the module will be not involved again during the next selection of a module, in favour of the modules having not yet communicated with the terminal. In order that the module comes back again into the IDL state, it has first to pass through the OFF state, that is he has to be disabled. In practice, this may mean for example that the user of a contactless chip card which has already carried out a transaction must, if he wants to perform a new transaction, move its card away from the supply magnetic field and present the card again.

It is evident that the method of the invention can have a lot of alternatives and embodiments, in particular the following alternatives:

the terminal could force a module to leave the HALT state, for example by sending to it a direct selection message DIRSELECT-ID as illustrated in FIG. 6, or, in the case of a magnetic field supply, by suppressing the supply field during a short moment, a module in the ACT state receiving an ACTIV or ACTIVALL message during the waiting time which is before the sending of its response R could remain in the ACT state, in place of coming back to the idle state IDL, a module in the idle state IDL could switch to the selection state SEL when receiving a direct selection message DIRSELECT-ID which designates it, a general interrogation message ACTIVALL or a complementary interrogation message ACTIV could bring back into the ACT state a module which is in the WFS, SEL or EXEC state.

Lastly, it is possible to improve the selection operation by providing that a module which has received a selection confirmation SELECT-ID sends a message to the terminal (for example a response code R) notifying that it is actually selected.

Practical and technological aspects of the carrying out of the invention a—Determination of the response position by the modules To determine a response position, a module has first to generate a random number ALINT, the response position P being equal to the random number ALINT multiplied by a time base common to all the modules. In practice, the start of the response message R or the response/identification message ID can be obtained by a temporisation or simply by means of a down-counter circuit loaded at the value ALINT and controlled by a clock signal H common to all the modules (see however the section "module synchronisation" hereafter).

To generate the number ALINT, the modules have in principle to be provided with a random or pseudo-random generator. However, the present invention provides an advantageous solution suitable for the modules provided with an authentication function enabling the fight against fraud.

Let's recall here that an authentication function, or cryptographic function, enables the transformation of a binary word or input code CE into another binary word or authentication code CA in the form of:

$$CA = F_{Ks}(CE) \qquad (2)$$

$F_{Ks}$ representing the authentication function and Ks the secret key of this function. In a conventional manner, an authentication procedure consists in the sending of an input code CE by the terminal. On receiving the code CE, the module generates the authentication code CA and sends it to the terminal. The terminal, which has the function $F_{Ks}$ at its disposal, checks the accuracy of the code CA before performing any operation requested by the module. Such an authentication procedure, when provided, takes place at the EXEC state stage, that is when the module is selected.

Here, an idea of the invention is to use the authentication function of the modules to generate the random number ALINT. The advantage is that it is no more necessary to provide, in each module, a random number generator. More particularly, according to the invention, the terminal inserts into the general activation message ACTIVALL or particular activation message ACTIV a random code ALEXT that it has generated by its own. Each module transforms the random code ALEXT into another random code ALINT by means of the authentication function it is provided with:

$$ALINT = F_{Ks}(ALEXT)$$

The random code ALINT or a part of this code is used to define the response position. Of course, this solution assumes that each module is in possession of a particular secret key Ks, which is generally the case in practice, otherwise all the response positions which are computed by means of the ALEXT code would be the same.

b—Synchronisation of the modules on the response scale

In some implementations, the modules are surrounded with an alternating magnetic field whose oscillation frequency provides the clock signal, and are naturally synchronised. In other implementations, the modules comprise an oscillator which generates the clock signal, and cannot be perfectly synchronised because of the operational tolerances of each oscillator. However, an advantage of the method of the invention is that it can be applied to modules imperfectly synchronised. Indeed, in practice, the clock frequency is generally higher than the frequency used for emitting the message bits, one bit being able to mean some tens or some hundreds of clock pulses, so that a certain clock offset between the modules can be accepted. Otherwise, each response scale RSP, RSP', . . . starts at the moment the last received ACTIVALL or ACTIV message has ended, so that the modules are automatically resynchronised at each new response scale. Thus, with the invention, clock drifts cannot lead to significant synchronisation defects. In practice, it is enough if the oscillators of the modules are tuned on about the same frequency, even if the working tolerances of the oscillators cause clock offsets of about some pulses.

c—Usefulness of the response scale

The response scale has the advantage to simplify the implementation of the method of the invention while avoiding collision cases which would be rather complicated to deal with. However, it will be obvious for the man skilled in the art that the selection method according to the invention could be carried out without such a response scale, the various modules being then able to emit the responses R in a pure random way and be totally desynchronised.

d—Technology of the modules

As it will be obvious for the man skilled in the art, the present invention can be implemented by means of microprocessor circuits as well as by wired logic circuits. As a matter of fact, the control of the logic states of the modules and of the transitions between these states can be performed by software as well as by a wired sequential circuit. In the first case, the various logic states are materialised by subprograms and in the second case by state bits (or flags) arranged in a specific register and commanding the functioning of the wired sequential circuit.

e—Detection of collisions by the terminal

It goes out from what comes before that the terminal must be able to detect collisions of messages which are emitted by the modules, in particular collisions between identification messages ID. However, contrary to the prior art method, it is not necessary to perform the collision detection bit by bit. A global collision detection is enough, for example by means of a conventional message signature method or also by a detection of the anomalies which appear in the electrical voltages representing the logic levels of the bits forming the messages received by the terminal.

f—Application fields

The present invention has been developed and put into practice as an alternative to the prior art sorting method, which is described in the preamble. It refers first of all to the field of contactless electronic labels, contactless chip cards, etc. However, the selection method of the invention is suitable for any system involving a multipoint link between a terminal and peripheral modules, this link being wired or contactless, for example of the infrared type, ultra high frequency, inductive, broadcast type, etc.

We claim:

1. A method of selecting an electronic module from a plurality of modules to complete a communication comprising the steps of:

sending a general interrogation message to each of said plurality of modules, each of said plurality of modules determining a random response position on a temporal response scale upon receiving the general interrogation message;

sending a response message from the module first reaching the random response position;

selecting the module which responds first to complete the communication and setting each of the plurality of modules which have not responded first into an idle state until another general interrogation message is sent; and if more than one module responds first, thereafter sending a complementary interrogation message to each of the plurality of modules whereupon only the modules which responded first determine a random response position.

2. The method according to claim 1, wherein each of the modules which have not responded first are set into the idle state by receipt of a message before the respective module reaches the random response position.

3. The method of claim 1, wherein each module not responding first to the complementary interrogation message is set by the complementary interrogation message to the idle state whereby each module set in the idle state does not subsequently generate a response position.

4. The method of claim 1, wherein each module is released from the idle state upon receipt of the general interrogation message.

5. The method of claim 1, wherein the response message comprises identification data from which a module can be uniquely identified.

6. The method of claim 5, wherein upon detection of the identification data, a selection confirmation message including the identification data is sent to each of the plurality of modules.

7. The method of claim wherein the response message does not include identification data from which the module can be identified, the method further including the steps of:

detecting the response message;

transmitting an identification request message; and sending a second response message including the identification data.

8. The method of claim 1, wherein the temporal response scale comprises a plurality of discrete response positions.

9. The method of claim 8, wherein the maximum duration of a response message is equal to the time interval between two successive response positions.

10. The method of claim 8, wherein the response position is determined from a random code included in one of the general interrogation message and the complementary interrogation message.

11. The method of claim 10, wherein the response position is determined by each of the plurality of modules by using an authentication function.

12. A method for an electronic module to provide a response to a general interrogation message or a complementary interrogation message, the complementary interrogation message being sent when a collision is detected, the method comprising the steps of:

determining in the electronic module a first random response position in response to receiving the general interrogation message and subsequently sending the response when the first random response position is reached;

setting itself into an idle state when a message is received before the first random response position is reached; and, in response to receiving the complementary interrogation message, determining in the electronic module a second random response position if the module had sent a response for which the collision was detected, and setting itself into the idle state if the module determined a response position for which the response would occur after the time of the collision.

13. A method for an electronic terminal to communicate with a plurality of electronic modules comprising the steps of:

sending a general interrogation message to each of said plurality of modules, each of said plurality of modules determining a random response position on a temporal response scale upon receiving the general interrogation message;

receiving a response message from the module first reaching the random response position;

sending a selection message to the module which responds first to initiate completion of the communication and setting each of the plurality of modules which have not responded first into an idle state until another general interrogation message is sent; and if more than one module responds first, thereafter sending a complementary interrogation message to each of the plurality of modules whereupon only the modules which responded first determine a random response position.

14. The method according to claim 13, wherein the terminal sends an identification request signal upon receiving the response message.

15. The method according to claim 13, wherein one of the general interrogation message and the complementary interrogation message includes a random code.

* * * * *

UNITED STATES PATENT AND TRADEMARK OFFICE
CERTIFICATE OF CORRECTION

PATENT NO.    : 6,337,619 B1
DATED         : January 8, 2002
INVENTOR(S)   : Jacek Kowalski, Bruno Charrat, Eric Bouyoux and Michel Martin It is certified that error appears in the above-identified patent and that said Letters Patent is hereby corrected as shown below:

<u>Column 11,</u>
Line 23, should read -- 7. The method of claim 1 wherein the response message --.

Signed and Sealed this

Thirteenth Day of August, 2002

*Attest:*

*Attesting Officer*

JAMES E. ROGAN
*Director of the United States Patent and Trademark Office*